United States Patent [19]

O'Malley et al.

[11] Patent Number: 4,493,627
[45] Date of Patent: Jan. 15, 1985

[54] APPARATUS FOR MOLDING FOAM CUSHION PACKAGING

[75] Inventors: Michael P. O'Malley, Stratford; Alfred R. Thibault, Naugatuck, both of Conn.

[73] Assignee: International Packaging Systems Inc., Norwalk, Conn.

[21] Appl. No.: 408,453

[22] Filed: Aug. 16, 1982

[51] Int. Cl.³ .................................................. B29D 27/04
[52] U.S. Cl. .................................. 425/89; 264/46.6; 264/46.8; 425/110; 425/388; 425/437; 425/817 R
[58] Field of Search .............. 425/388, 387.1, 89, 425/110, 112, 437, 817 R; 98/33 R, 32; 264/547, 548, 549, 46.5, 46.8, 46.6, 335

[56] References Cited

U.S. PATENT DOCUMENTS

| | | | |
|---|---|---|---|
| 2,973,558 | 3/1961 | Stratton, Jr. | 264/549 |
| 2,993,232 | 7/1961 | Van Hartesveldt | 425/388 |
| 3,258,814 | 7/1966 | Harrison | 425/388 |
| 3,377,656 | 4/1968 | Tilden | 425/388 |
| 3,751,208 | 8/1973 | Hepworth | 425/388 |
| 3,838,962 | 10/1974 | Wright | 264/549 |
| 3,988,093 | 10/1976 | Birchenough | 425/388 |
| 4,092,390 | 5/1978 | Mulvany, Jr. | 264/522 |
| 4,270,892 | 6/1981 | Faunce | 425/388 |

Primary Examiner—James Lowe
Attorney, Agent, or Firm—Curtis, Morris & Safford

[57] ABSTRACT

An apparatus is described for use in a urethane foam molding process to make a molded packing that is employed in the packaging of an article. A generally air tight housing is placed in cooperative relationship with a box in whose chamber the molded packing is to be made with one housing port located for air flow communication with the chamber and another housing port being located for air flow communication with ambient air. A pair of motor driven air blowers are mounted inside the housing with each air blower operatively positioned at a housing port. When one air blower is energized it causes the evacuation of air from the chamber of the box through one port to draw and hold a polyethylene sheet into the cavities of the chamber and of a mold form located therein. The air is exhausted past the other air blower and port. When the other air blower is energized, air flow through the ports is reversed so as to blow air into the box chamber for the release of the molded packing.

3 Claims, 3 Drawing Figures

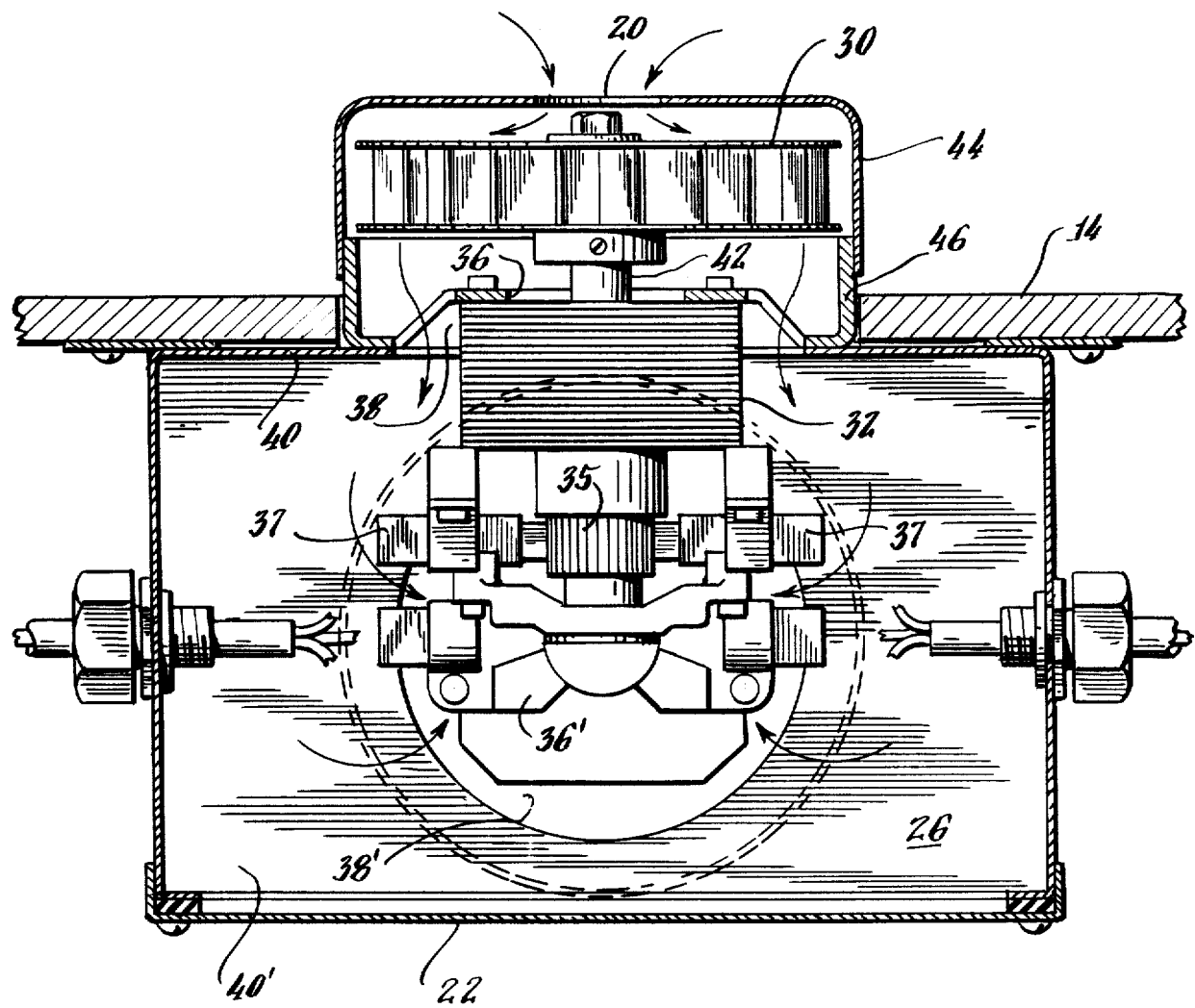

APPARATUS FOR MOLDING FOAM CUSHION PACKAGING

FIELD OF THE INVENTION

This invention relates to a vacuum and air release assembly generally and more specifically to such assembly for use in the making of a molded packing for packaging an article.

BACKGROUND OF THE INVENTION

In the shipment of goods such as typewriters, video displays and the like, care must be taken to package such articles with sufficient protection against careless handling. One technique involves the formation of molds that are specifically shaped to fill a portion of the space between the article and the container in which it is shipped.

One technique for packaging an article involves a foam-in-place process wherein the article is placed in a container and a sheet material is tucked around the article. A urethane foam material is then poured into the space between the sheet and the container to fill the void and firmly support the article. Since such technique may result in the support of the article at sensitive areas where damage may result, another packaging technique involves the preforming of foam-in-place packings that are shaped to fill selected voids in the space between the article in its container.

The preformed molded packings are made by using a form having a shape that is generally representative of the article mounted in the chamber of a mold box. A sheet material is then placed over the mold box opening and a vacuum is formed between the sheet and the mold box so as to draw the sheet into the corners and various cavities of the form and the box chamber. A foam is then poured over the sheet and the mold box is closed until the foam is cured. After curing the foam-in-place molded packing and sheet are removed from the box and used to package an article in a container have the same size as the box.

In another technique a mold form projects from a platform and a polyethylene separator sheet is placed over it. A vacuum draws the sheet over the mold form and a container with open flaps in which the article is to be shipped is placed over the mold form to seat on the platform. The foam is then injected into the container to form a molded packing directly in the container in which an article is to be shipped.

The time required to make a molded packing is a function of the time needed to insert the sheet material, pour the foam, await its cure and remove the sheet and mold form from the completed packing. When a large number of molded packings need to be made, it becomes highly desirable to increase the speed of their manufacture.

SUMMARY OF THE INVENTION

With a vacuum and air release assembly in accordance with the invention, a partial vacuum can be conveniently established in a work station and rapidly altered to a pressurized state by employing a housing that is generally air tight except for a pair of air flow ports. One port is in communication with the work station and the other port is in communication with ambient air. A pair of air blowers are placed in the housing. One air blower is oriented to evacuate air from the work station through the port in communication therewith and the other air blower supplies air to the work station through the same port for a pressurization of the work station. Such work station may be around a mold form used to produce a molded packing for an article and thus initially draws the separator sheet in close proximity with the mold form and subsequently facilitates a release of the sheet and molded packing.

In accordance with one vacuum and air release assembly in accordance with the invention, the work station is inside the chamber of a mold box with which the assembly is operatively connected. The packing is made by alternately forming a vacuum to draw a sheet material over a form in the mold box and into the corners of the box and by pressurizing the chamber to release a molded packing when it is ready for removal. The vacuum air release assembly enables a quick drawing of the separator sheet into the corners and crevasses between the mold box and the mold form while concomitantly rapidly pressurizing the space between the sheet and the box for an easy and quick removal of the completed molded packing.

A vacuum and air release assembly in accordance with the invention includes a housing that is generally air tight except for first and second air ports, one of which is in air flow communication with the chamber of the mold box. A pair of air blowers are mounted inside the housing at the ports to force air respectively therethrough. When one air blower is energized, it generates a vacuum condition in the mold box by drawing air through the housing port in communication with the box and discharging the air from the other housing port. When the other air blower is energized, it generates a flow of air into the box through the two housing ports. Each air blower employs a motor driven by a low AC voltage 115 volt source that is commonly available where the assembly is likely to be used.

With an assembly in accordance with the invention, high air flows are generated with fans driven by DC electric motors, yet a safe structure is obtained by employing an air tight metal housing. As a result, the propagation of sparks by the ignition of combustible gases generated by the foam-in-place molding process is suppressed.

It is, therefore, an object of the invention to provide a vacuum and air release assembly which may produce a partial vacuum at a work station as well as a pressurized release in a rapid, safe manner. It is a further an object of the invention to provide, for the making of a molded packing used in the packaging of an article, a vacuum and air release assembly which enables a speed-up of the making of the packing, is safe to use and convenient to apply to the mold forming process.

These and other advantages and objects of the invention can be understood from the following detailed description of a vacuum and air release assembly in accordance with the invention and described in conjunction with the drawings.

BRIEF DESCRIPTION OF DRAWINGS

FIG. 3 is an enlarged vertical section view of the assembly taken along the line 3—3 in FIG. 2.

DETAILED DESCRIPTION OF DRAWINGS

Figure 1:
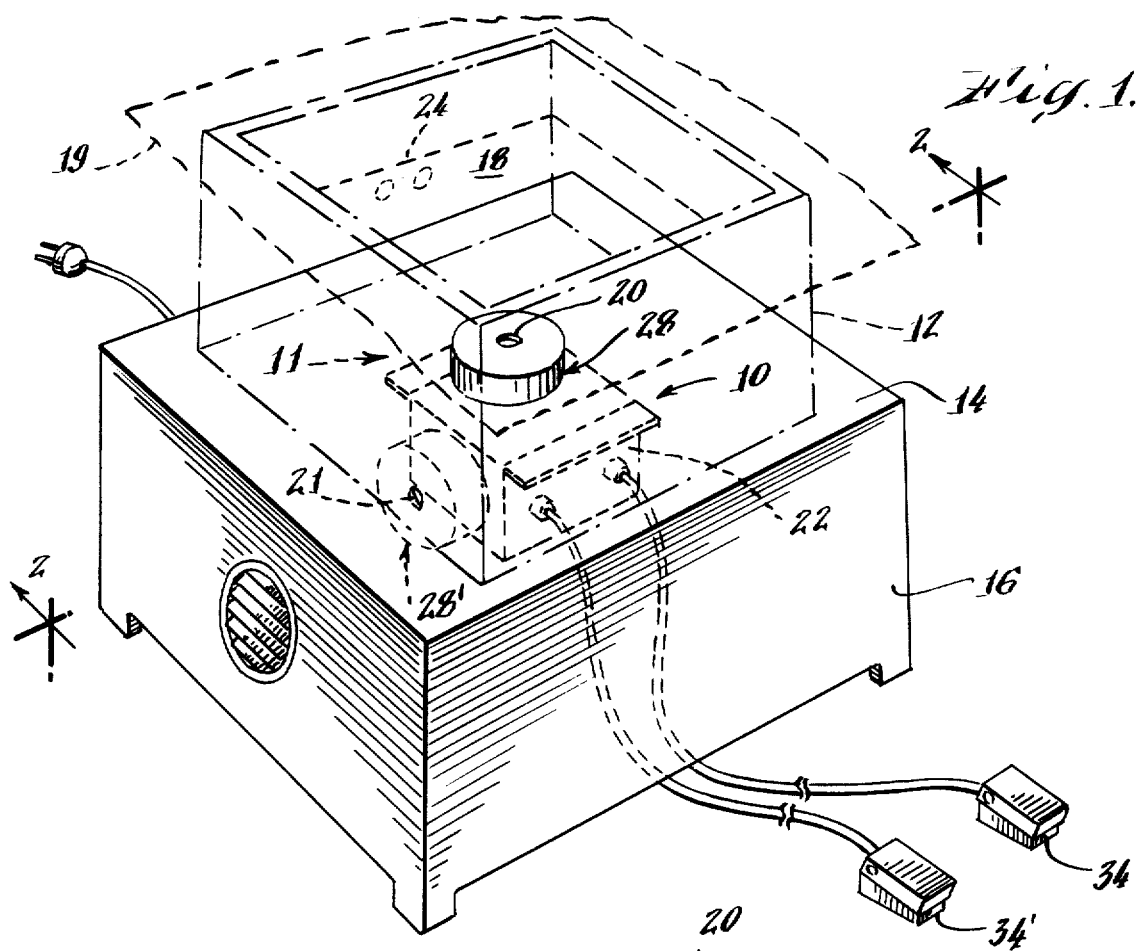
FIG. 1 is a perspective view of a vacuum and air release assembly installed for use in making a molded packing.
Figure 2:
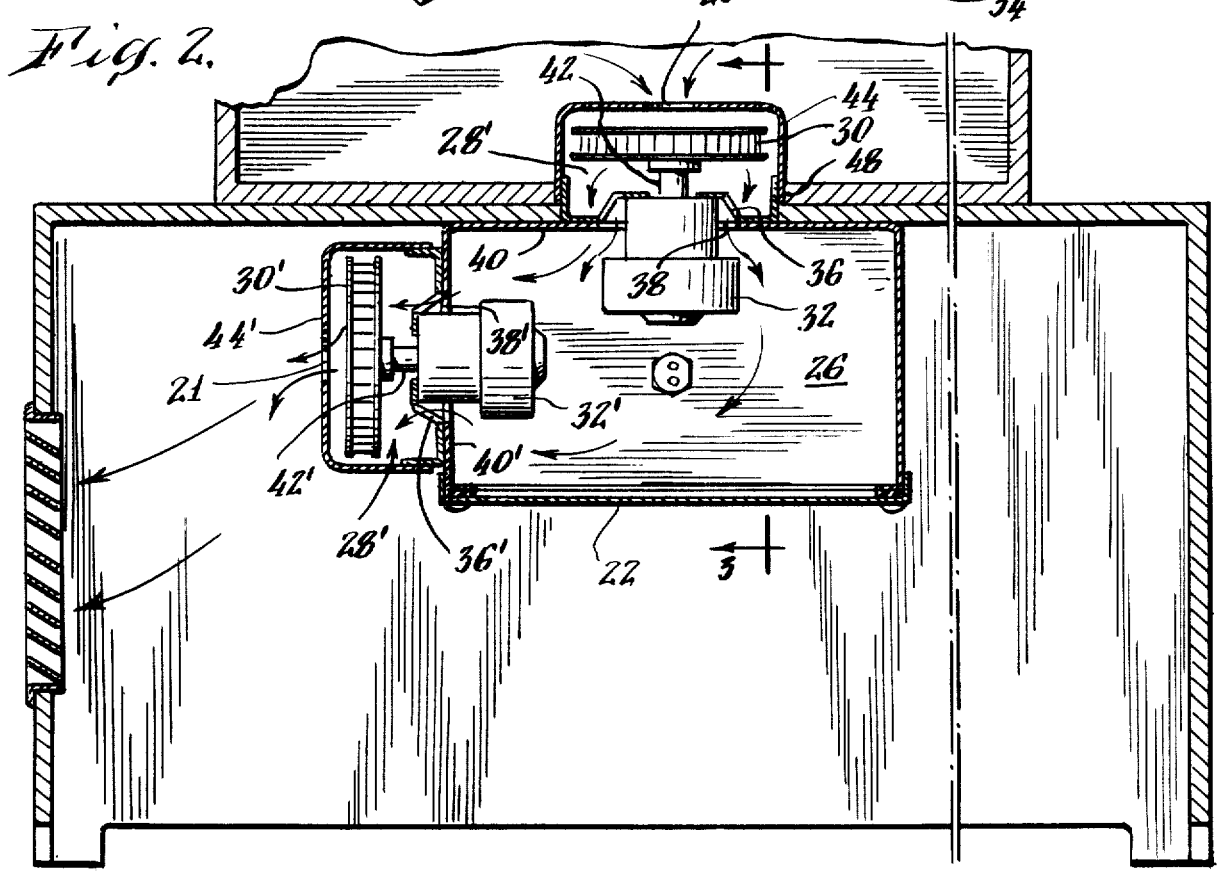
FIG. 2 is a broken vertical section view of a vacuum and air release assembly in accordance with the invention.

With reference to FIGS. 1 and 2, a vacuum and air release assembly 10 is shown in cooperative relationship at a work station 11 with a mold box 12 in which a molded packing is to be made for packaging of an article (not shown). The box 12 is shown supported on the upper surface 14 of an enclosure 16 to which the assembly 10 is mounted.

Box 12 is shown in outline with its chamber 18 empty, though in practice a cover is included and the box chamber 18 contains a mold form whose shape defines in cooperation with the box 12 the packing to be formed for packaging of the article. The form may be the article itself or have a shape that generally conforms to the shape of the article. The molded packing is formed using known urethane foaming mixtures supplied through a well known mixing gun (not shown). The box chamber 18 has a size commensurate with that of the container in which the article is to be packaged. Box 12 may also be the container in which the article is shipped and thus the packing is made with a mold form over which the container is placed.

As part of the process of making molded packings for the packaging of articles, a separator sheet material 19 is used to protect the form and inner walls of box 12 from the foam. A sheet 19 is used with each making of a molded packing and as is well known in the art, is made of polyethylene since that does not adhere to the urethane foam. Since the form in chamber 18 of mold box 12 may have deep cavities, it is important that a partial vacuum be made as the polyethylene sheet 19 is placed over the mold box to help draw the sheet into the cavities around the form before making the packing.

The vacuum and air release assembly 10, therefore, is so mounted with respect to chamber 18 of mold box 12 that a port 20 in the housing 22 of assembly 10 is in air flow connection with the portion of the chamber 18 that lies between the sheet and the mold form in the box 12. An apertured platform 24 is commonly provided to separate the chamber 12 into an air plenum chamber adjoining and in communication with port 20 in assembly 10 and the portion of the chamber in which the molded packing is to be formed. The sheet 19, therefore, is made to lie flat where a cavity space surrounding the form extends down to apertured platform 24.

The assembly housing 20 has a pair of ports 20, 21, one of which, 21, serves to exhaust air from chamber 18 during its evaluation or entry of air from ambient air when the molded packing is to be released. Housing 20 is an air tight structure having an internal enclosure 26 sized to accommodate a pair of air blowers 28, 28'. The air blowers 28, 28' include fans 30, 30' driven by AC motors 32, 32'. The air blower 28 is operatively mounted with respect to port 20 so as to exhaust air as shown by the arrows in FIG. 2 from the box chamber 18 by way of the air passage formed past air blower 28' and through port 21.

Air blower 28' is operatively mounted with respect to port 21 to cause a reverse air flow into box chamber 18 through port 21 past air blower 28 and through port 20. Hence, depending upon which air blower 28 is energized, the air is either exhausted from chamber 18 to create a vacuum in the space below sheet 19 and box 16 or air is forced into chamber 18 to help release the finished molded packing and even partially eject it from box 16. The air blowers 28, 28' may thus be considered as operating in tandem with each other.

Energization of air blowers 28, 28' may be done with suitable two pole single throw foot switches 34, 34' connected to an AC supply. This may be advantageously a conventional 115 volt AC source. Since AC is used as the power source, the motors 32, 32' are sized to provide a high air flow of about 100 cubic feet per minute. Housing 20 is advantageously formed of metal that is electrically grounded so that the propagation of sparks from the ignition of combustible gases generated by the molding process is less likely to occur.

The air blowers 28, 28' are shown connected to the inside of rectangular housing 20 with brackets 36, 36' that span enlarged apertures 38, 38' in walls 40, 40'. Wall 40 is an upper wall of housing 20 while wall 40' is a side wall. The brackets 36, 36' respectively support motors 32, 32' whose output shafts 42, 42' in turn are respectively connected to fans 30, 30'. The fans 30, 30' are located outside of walls 40, 40' in protruding cylindrical fan enclosures 44, 44' in which the housing ports 20, 21 are located.

The direction of air flow from fans 30, 30' depends upon the manner in which they are mounted on shafts 42, 42' and the direction of rotation of motors 32, 32'. In the preferred mode a vacuum is obtained with the operation of air blower 28 so that it causes air to exhaust from the port 21 opposite air blower 28'. When air is to be blown into box 12 air blower 28' is turned on and air is drawn into the housing 20 and forced to pass through aperture 38 past air blower 28 and exhausted through port 20 into chamber 18 of box 12.

The fan enclosure 40 is shown to protrude through an opening 46 of enclosure 16 and opening 48 of box 12 into chamber 18. The housing upper wall 40 is sufficiently large to seal off openings 46, 48 and thus permit air flow between the chamber 18 and box 12 only through ports 20 and 21.

Air flows through enclosure 16 by way of a vent 50 or a bottom located peripherally extending spacing 52 formed by raising enclosure 16 with corner located supports 54.

Having thus described a vacuum and air release assembly in accordance with the invention for use in the making of a molded packing for packaging of an article, the advantages of the invention can be appreciated. Air flow out of or into the mold box may be conveniently controlled by selecting which air blower is to be turned on and valving to establish the desired pressure condition in the box is avoided. Variations from the description may be made without departing from the invention. For example, the enclosure 16 may be deleted and the assembly 10 mounted directly to the bottom of box 12. The vacuum and air release assembly may be used in connection with a process for making molded packings directly into containers in which the articles to be shipped are placed.

What is claimed is:

1. A vacuum and air release assembly for use in preforming a molded cushioning packaging material comprising:
   a work station adapted to receive a form having the shape of an article to be enclosed within said molded cushioning packaging material,
   a housing spaced from said work station to define a space to receive a cushioning foam material to surround said article,
   said housing being generally in air tight sealing relationship with respect to said work station, first blower means operatively associated with said work station to effectively impart a vaccum condition within said housing through an air access port in said work station, second blower means operatively associated with said work station to blow air into said housing through said air access port, means for selectively activating said first and second blower means, means for injecting a foaming cushioning material into said space between said work station and the interior surface of said housing about a separator sheet placed over said form on said work station, whereby activation of said first blower means evacuates air from within said housing to cause said separator sheet to intimately contact said form so that said cushioning foam material completely surrounds said form and separator sheet in intimate contact therewith and activation of said second blower means after said cushioning foam material has set releases said forming cushioning foam material from contact with said work station.

2. The assembly as defined in claim 1 wherein said housing is a removable cover member having inside dimensions conforming to a box to package said article thereby to form a molded cushioning packaging material dimensioned to fit into said box and dimensioned to receive a shaped article therein.

3. The assembly as defined in claim 1 wherein said housing is a shipping box in which said article is to be packaged wherein said molded cushioning package material intimately fills said box and is dimensioned with a cavity to receive a shaped article therein.

* * * * *